United States Patent [19]

Stowe et al.

[11] 4,444,458
[45] Apr. 24, 1984

[54] SUBSTRATE RUGGEDIZED OPTICAL FIBER APPARATUS

[75] Inventors: David W. Stowe, Buffalo Grove; Paul M. Kopera, Franklin Park, both of Ill.

[73] Assignee: Gould Inc., Rolling Meadows, Ill.

[21] Appl. No.: 267,187

[22] Filed: May 26, 1981

[51] Int. Cl.³ .............................................. G02B 7/26
[52] U.S. Cl. ............................ 350/96.15; 350/96.20; 350/320
[58] Field of Search ............ 350/96.10, 96.11, 96.12, 350/96.13, 96.15, 96.19, 96.20, 96.21, 320

[56] References Cited

U.S. PATENT DOCUMENTS

| | | | |
|---|---|---|---|
| 3,860,405 | 1/1975 | Coucoulas et al. | 350/96.21 X |
| 3,936,631 | 2/1976 | Muska | 350/96.15 X |
| 3,982,123 | 9/1976 | Goell et al. | 350/96.15 X |
| 4,214,810 | 7/1980 | Stewart | 350/96.21 |
| 4,315,666 | 2/1982 | Hicks, Jr. | 350/96.15 |
| 4,325,636 | 4/1982 | Schiffner | 350/96.15 X |
| 4,375,312 | 3/1983 | Tangonan | 350/96.12 |

FOREIGN PATENT DOCUMENTS

| | | | |
|---|---|---|---|
| 52-14430 | 2/1977 | Japan | 350/96.15 |
| 53-15149 | 2/1978 | Japan | . |
| 53-91752 | 8/1978 | Japan | . |
| 54-101334 | 8/1979 | Japan | 350/96.15 |

OTHER PUBLICATIONS

Dabby, "Permanent Multiple Splices of Fused-Silica Fibers," *Bell Syst. Tech. Journal*, vol. 54, No. 2, Feb. 1975, pp. 451–455.

Sheem et al, "Acoustic Sensitivity of Single-Mode Optical Power Dividers," *Opt. Lett.*, vol. 4, No. 10, Oct. 1979, pp. 322–324.

Bergh et al., "Single-Mode Fibre Optic Directional Coupler," *Electronics Lett.*, vol. 16, No. 7, Mar. 1980, pp. 260–261.

*Primary Examiner*—John D. Lee
*Attorney, Agent, or Firm*—K. H. Pierce; E. E. Sachs

[57] ABSTRACT

Optical devices having one or more rigidly supported optical fibers and a method of making thereof are provided in which one or more optical fibers are interfaced with a rigid support material by molecular restructuring of interfacing surface areas of the fibers and the support material. The rigidly supported optical fiber may be fabricated by assembling a longitudinal outer surface portion of the fiber in juxtaposition with a rigid support material having a lower melting point than the fiber. This assembly may be heated to allow partial liquification of the support material and fiber along the outer surface of the fiber to allow fusing therebetween. The assembly may then be cooled below the melting point of the support material to provide a ruggedized fiber-optic assembly comprising an optical fiber fused to a rigid support material. A nonstick mold material also may be provided during assembly which has a substantially higher melting point than either the fiber or the support material. The mold may be placed in juxtaposition with the fiber to prevent the fiber from being totally embedded in the support material. Various optical devices may be formed from combinations of such rigidly supported optical fibers.

39 Claims, 21 Drawing Figures

SUBSTRATE RUGGEDIZED OPTICAL FIBER APPARATUS

CROSS REFERENCE TO RELATED APPLICATION

This application is related to U.S. Ser. No. 06/267,205 for Optical Fiber Apparatus Including Substrate Ruggedized Optical Fibers, filed concurrently herewith by David W. Stowe and commonly assigned.

BACKGROUND OF THE INVENTION

A. Field of the Invention

The present invention relates generally to fiber optics, and more particularly to optical fibers fused to a rigid support material and fiber-optic apparatus formed therefrom.

B. Description of the Prior Art

In the field of fiber-optic systems, a major difficulty arises from the fact that optical fibers are relatively fragile structures which may be easily broken when subjected to stress. It has long been recognized by those skilled in the art that it would be highly desirable to rigidly support an optical fiber in order that it may be more easily manipulated. A previous solution to this problem has been to provide a rigid support material with a V-shaped groove therethrough in which to place the fiber. Typically, the fiber is maintained in position with an adhesive or rigid cover. This solution has several disadvantages. For example, it is difficult to satisfactorily polish or etch an optical fiber so maintained. Further, the adhesive material may deform with time, thus altering the position of the fiber and possibly affecting the optical transmission characteristics of the fiber in an undesirable manner.

Because satisfactorily rigidly supported fibers have been heretofore unavailable, it frequently has been necessary to assemble fiber-optic devices while the optical fibers are in a relatively fragile unsupported state and then encase the device in a protective housing such as an epoxy-filled housing, see e.g., Sheem and Giallorenzi, 4 *Optics Letters*, No. 10 (Oct. 1979) page 29; and Bergh, Kotler, and Shaw, 16 *Electronics Letters*, No. 7 (March 1980) page 260. The lack of availability of rigidly supported fibers capable of being satisfactorily polished or etched increases fabrication costs of many optical devices since the incidence of breakage of the fragile optical fibers is high.

SUMMARY OF THE INVENTION

In view of the foregoing, an object of the present invention is the provision of an optical fiber fused to a rigid support material.

Another object is to provide an optical fiber which may be selectively etched.

A further object of the invention is the provision of a rigidly supported optical fiber which may be polished along a longitudinal portion of the surface of the fiber.

Still another object is to provide reliable fiber-optic apparatus using rigidly supported optical fibers.

A further object of the present invention is to provide rigidly supported optical fibers which may be inexpensively assembled into a variety of optical devices such as optical filters, couplers, polarizers, multiplexers, surface-wave acoustic devices, isolators and sensors.

The above objects are given by way of example, thus, other desirable objectives and advantages achieved by the invention may occur to those skilled in the art. The scope of the invention is to be limited only by the appended claims.

A rigidly supported optical fiber is described wherein a longitudinal portion of the fiber is actually molecularly interfaced with a rigid support material. A molecular interface between the rigid support material and the fiber may be formed by a fusion-type process in view of the fact that the support material typically has a melting point much lower than that of the fiber. Accordingly, during fabrication of the rigidly supported fiber, the support material and fiber may be heated so that the support material readily deforms about the fiber and only partial liquification, if any at all, of the fiber occurs. Thus, the support material may be easily fused to the fiber without undue liquification of the outer surface of the fiber during fabrication. After the fiber has bonded or fused to the rigid support material, longitudinal or axial cross sections of the fiber may be selectively etched or polished as desired to fabricate a variety of optical devices.

BRIEF DESCRIPTION OF THE DRAWINGS

FIG. 11 is a photograph taken through a scanning electron microscope illustrating the molecular interface of the subject invention magnified 700 times between a fiber and a substrate.

DETAILED DESCRIPTION OF THE PREFERRED EMBODIMENT

Figure 1A:
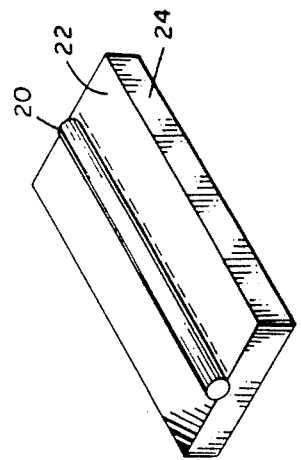
FIGS. 1a–d illustrate the process of embedding an optical fiber in a rigid substrate.
Figure 1B:
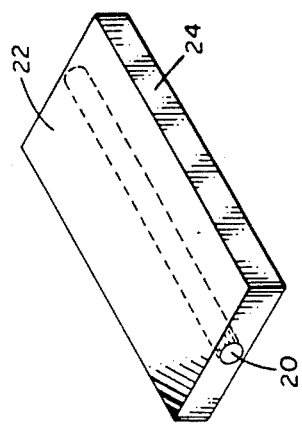
Figure 1C:
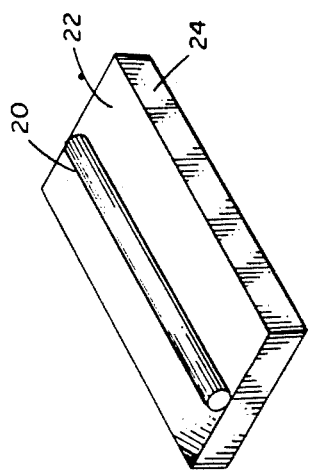
Figure 1D:
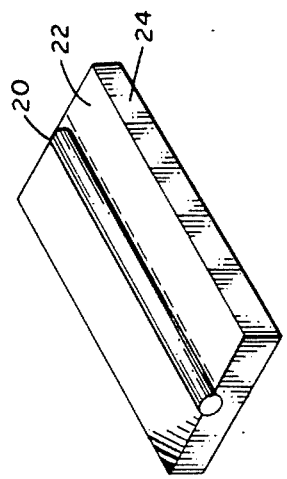
Figure 2A:
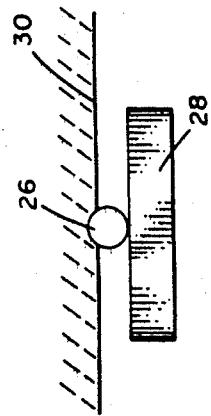
FIGS. 2a–d illustrate a similar process wherein the substrate is melted about a fiber.
Figure 2B:
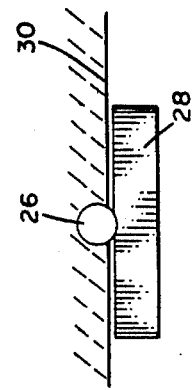
Figure 2C:
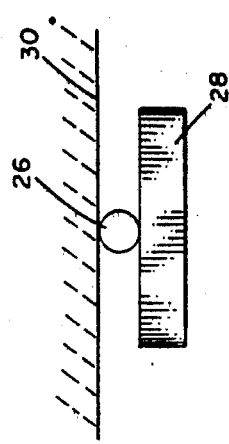
Figure 2D:
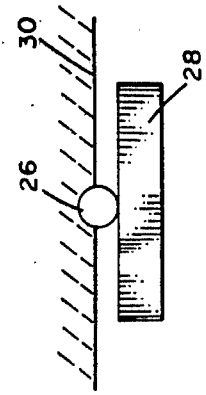

We have recently discovered that it is possible to fuse an optical fiber to a rigid substrate substantially thicker than the fiber without breaking the fiber when the diameter of the fiber is relatively small, for example, less than approximately 400 microns in diameter. It has previously been assumed by those skilled in the art that it was not possible to fuse a doped fused silica optical fiber to a glass substrate having a different coefficient of thermal expansion because previous attempts to fuse larger quantities of the two materials consistently resulted in fracture of one of the materials upon cooling. The present invention comprehends that sufficiently small-diameter fibers may be fused to a substrate having a larger thermal coefficient of expansion without breakage. Unexpectedly, breakage has not occurred during attempts to fuse small-diameter fibers to a glass substrate with substantially different thermal expansion coefficients because the optical fiber apparently stretches during cooling rather than breaking. However, the precise bonding mechanism by which the optical fiber successfully fuses to a substrate is not known. What is known, however, is that it is indeed possible to create a molecular interface between an optical fiber and a relatively large, rigid substrate without breaking the fiber or undesirably changing its optical characteristics to create a ruggedized optical fiber whereby the fiber remains surprisingly loss free after embedding. The bond produced between the fiber and the substrate support material is superior to traditional adhesive bonds because the bond produced by the subject method etches uniformly with the fiber and the substrate.

The basic process for molecularly bonding or fusing a fiber to a substrate is illustrated in FIG. 1. Very basically, heat is applied to a longitudinal portion of fiber 20 which is in juxtaposition with surface 22 of substrate material 24. It is preferred that the substrate material have a lower melting point than the fiber 20 so that when the fiber and substrate are heated, the viscosity of the surface of the substrate will be lowered more readily than the viscosity of the surface of the fiber. Thus, as can be seen in FIG. 1b, the substrate will molecularly redistribute itself about the fiber so that the fiber becomes embedded in the substrate. Partial liquification of the outer surface of the fiber 20, FIG. 1c, may be allowed so that fusion between the fiber and substrate will occur. However, it is desirable in the preferred embodiment to allow minimal liquification of the outer surface of the fiber so as to substantially prevent undesirable changes in the optical characteristics of the fiber.

FIG. 11 is a photograph of an embedded fiber highly magnified. The method for producing an embedded fiber having the configuration illustrated in the photograph is discussed in depth infra with respect to FIGS. 2a-d. In this method, a substrate is placed above a fiber and then heated to deform the substrate onto the fiber. As can be seen in the photograph in FIG. 11, a molecular interface 19 is formed between the surface of the fiber 21 and the substrate 23. The type of interface formed between the two materials is not precisely known, however, a chemical analysis of the two materials empirically indicates that diffusible constituents in at least one of the fiber or the rigid support material diffuse into the other material in measurable quantities during the bonding process. For example, when the substrate material is Corning Code 7070 glass having a diffusible constituent of boron and the optical fiber is a single-mode fiber having an outer cladding which is relatively free of boron prior to bonding, then a chemical analysis of the fiber after bonding reveals that boron from the substrate has diffused approximately 5 Å into the cladding.

The present invention comprehends that a variety of support means or substrates may be used. As previously noted, it is preferable to have a substrate which has a substantially lower melting point than the melting point of the fiber. However, the desired difference in melting points of the fiber and substrate varies with difference in coefficient of thermal expansion of the specific type of optical fiber and substrate used. The closer the coefficients of thermal expansion are between the two materials, the less critical it becomes to have substantial differences between the melting points of the two materials. For example, it is possible to fuse a doped fused silica optical fiber having a melting point of approximately 1600° C. and a coefficient of thermal expansion of $5 \times 10^{-7}/°$ C. to a Corning Code 7740 glass substrate having a melting point of approximately 800° C. and a coefficient of thermal expansion of $32.5 \times 10^{-7}/°$ C. Similarly, it may also be possible to fuse the same optical fiber to a Corning Code 7070 glass substrate having a melting point of approximately 750° C. and a coefficient of thermal expansion of $32 \times 10^{-7}/°$ C. When the two materials are heated simultaneously, they experience a differential rate of expansion. This differential is proportional to the difference in their thermal expansion coefficient, C. If the two materials are fused at the melting or softening point, $T_s$, of the lower of the two materials, upon cooling the total differential strain between the materials may be described by:

$$S = C(T_s - T_o)$$

where $T_o$ is the temperature at which the device is operated. Glass in a pure and undamaged form can sustain a strain of 0.1 without breakage. Using the subject interface technique, fusion of a substrate to a fiber is optimal if the strain produced is less than $5 \times 10^{-3}$. This requires that the product of the difference in expansion coefficients times the temperature change to be less than this amount; i.e., $$S = C(T_s - T_o)$$

is less than $5 \times 10^{-3}$. Accordingly, the fiber and the substrate must have sufficiently matched thermal expansion coefficients so that neither material breaks upon cooling. Further, the substrate must adhere sufficiently to the fiber to provide adequate bonding between the two materials. Adequate bonding is achieved when the substrate properly holds and masks the fiber during an etching or polishing operation.

In some instances, it may be desirable to use a rigid support material that is more resistant to etching than the fiber so that the fiber may be etched below the surface of the support material. However, in other instances, it is desirable that the fiber and substrate have similar etchant-reactive characteristics so that the fiber may be selectively etched along an exposed portion of its surface area in a highly controlled manner to produce an asymmetrically etched fiber.

The sequence of events illustrated in FIG. 1 is applicable when the fiber is more dense than the substrate, in which case the fiber will gradually sink into the softened substrate. This approach is useful when it is desired to have a fiber totally embedded in the substrate, FIG. 1d, or when it is desirable to have the fiber exposed, but lying somewhat below the substrate as in FIG. 1b and c, so that an axially extending arcuate surface area of a longitudinal portion of the fiber extends outwardly through the rigid substrate. In the latter case, a nonstick cover layer (not shown) may be provided to initially force the fiber into the substrate and to control the amount of exposed surface area of the fiber remaining after heating.

Other forces may be used to aid in embedding the fiber in the substrate such as centrifugal, magnetic, electrostatic, or gravitational forces. In the embodiment illustrated in FIG. 2a–d, the fiber may or may not be as dense as the substrate. This embodiment comprehends an assembly including a fiber 26 resting upon a nonstick surface 28, and a substrate 30 resting on top of the fiber having a lower melting point than the fiber. Heat is then applied to the fiber and the substrate to allow the substrate to gradually melt about the fiber. The substrate will tend to flatten upon heating at its outer surface but does not necessarily flow beneath the fiber. Thus, a portion of the fiber can be made to remain exposed after the nonstick material is removed. This method of fusing the fiber to the substrate may be preferred in instances in which it is desired to have the fiber exposed and even with the surface of the substrate. One advantage of this embodiment over the embodiment illustrated in FIG. 1 is that in this method, heat may be applied for a variable time period and the exact duration is not as critical because the fiber will not readily become totally embedded in the support material. In contrast to the embodiment illustrated in FIG. 1, in the embodiment illustrated in FIG. 2 the variation in shape of the substrate near the fiber with heating time is limited because the nonstick layer acts as a mold to prevent total engulfment of the fiber by the substrate.

A variety of nonstick materials may be used in the above embodiments as well as other embodiments discussed hereinbelow. As previously noted, a major function of the nonstick material is to act as a mold during heating to prevent a fiber from becoming totally embedded in the rigid support material. The nonstick surface material, however, may serve other functions, for example, it may distribute heat more evenly along the fiber and substrate to be fused. It may also act as a force-inducing means to bias the fiber toward the substrate to enhance penetration of the fiber into the substrate. Another function of the nonstick material may be to prevent unwanted access to the fiber and the substrate during heating by undesirable foreign elements. And, finally, quite obviously, the nonstick material may merely serve to support the fiber and rigid substrate material during heating. Generally it is desired that the nonstick material have a melting point or sublimation point much higher than that of the substrate or fiber material. In most embodiments, the nonstick material must remain rigid during the heating operation and be readily removable from the fiber and support material upon cooling.

In the currently preferred embodiment, vitreous carbon is used as the nonstick material 28; a single-mode, 4.5-micron diameter core is used as the optical fiber 26; and Corning Code 7070 glass is used as the substrate material 30. The single-mode fiber 26 is placed on a layer of vitreous carbon approximately ⅛" thick. A layer of Corning Code 7070 glass approximately 1/10" thick is then placed over the fiber and carbon layer. An additional layer of vitreous carbon (not shown) is then placed over the glass layer to protect the upper surface during heating and provide additional force to bias the glass substrate toward the fiber and to evenly distribute heat from a heating source (not shown) through the substrate and the fiber. If desired, additional weights may be placed upon the upper layer of vitreous carbon to bias the substrate 30 toward the fiber. In the preferred embodiment, residual oils and debris may be cleaned from the fiber, the substrate, and the nonstick material, by a triple solvent cleaning process which consists of successive rinses of trichloroethylene, acetone, and isopropyl alcohol followed by a deionized water bath. This technique is a standard industry technique for cleaning materials. The assembled fiber, substrate, non-stick layers, and weights may then be heated by a 1200 W quartz lamp to a temperature of approximately 800° C. for ten minutes to embed approximately 80% of the fiber 26 into the substrate 30. In the preferred embodiment, it is desirable to enclose the assembly and heating source in a reflective oven to more evenly distribute heat from the quartz lamp to the fiber and substrate.

Figure 4:
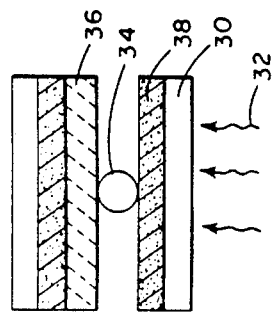
FIG. 4 illustrates an assembly similar to the assembly illustrated in FIG. 3, having heat applied upwardly on the assembly.
Figure 3:
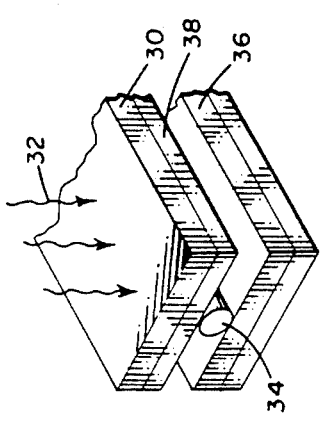
FIG. 3 illustrates one assembly for fusing an optical fiber to a rigid substrate wherein heat is supplied downwardly on the assembly.

The embodiments illustrated in FIGS. 3 and 4 include the additional element of a high melting point layer 30 to receive heat from a heat source 32. The type of heat source in these embodiments is not critical. Torches, flames, ovens, or radiant energy may be used for heating; and if uniformity of the heat source is desired, the high melting point layer and nonstick surface in combination may serve to evenly distribute heat to the fiber 34 and substrate 36. Further, uniformity of heat transmission may be accomplished by moving the heat source across the area desired to be heated. In the embodiments illustrated in FIGS. 3 and 4, the heat is applied predominantly, though not necessarily entirely, from the fiber side of the fiber/substrate assembly. Thus, the substrate is more readily softened in those areas in which it is desired to deform the substrate the most.

Figure 5:
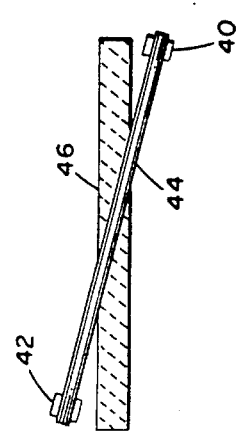
FIG. 5 illustrates an optical fiber in tension during fusion of the fiber to a substrate.

Furthermore, in the embodiments illustrated in FIGS. 3 and 4, the flatness or linearity of the fiber is determined largely by the nonstick material 38 in contact with the fiber. If the particular material chosen to be the nonstick material may be easily and precisely polished, the fiber may be made to lie flat to almost any desired tolerance. In addition, as illustrated in FIG. 5, tension means 40 and 42 may be provided for linearly maintaining the fiber during heating and cooling. Also, if it is desired to have a fiber 44 pass through the support material 46 at an angle, the fiber may be held taut by grippers at each end of the fiber at the desired angle as the support material is heated as shown. The embodiment as illustrated in FIG. 5 may be useful in optical devices in which it is desirable to have access to a fiber from both the top and bottom surfaces of a substrate.

As will be apparent to those skilled in the art, many modifications are possible using the basic approach described herein. For example, substrates of varying size and shape may be used to provide a rigidly supported optical fiber having a support material configuration which varies significantly over a relatively short longitudinal portion of the fiber. The embodiments which follow are provided by way of illustration to indicate some of the embodiments comprehended by the invention herein described.

Figure 6:
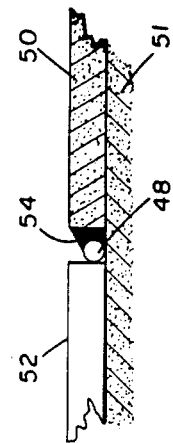
FIG. 6 illustrates another assembly for fusing an optical fiber to a substrate wherein the substrate is allowed to cover only a longitudinal portion of the fiber.

For example, as illustrated in FIG. 6, a fiber 48 may be fused to the edge of a support material 52 by substantially surrounding a longitudinal surface area portion of the fiber about its axis by more than 180° with a nonstick material 50, 51. In this embodiment, the degree of overflow of the substrate material 52 onto the fiber may be controlled by the heating cycle and the substrate height. The nonstick surfaces 50, 51 hold the fiber in place. Angular edge 54, as illustrated in black in FIG. 6, may also be used to hold the fiber against the substrate material.

It should be clear to those skilled in the art that a variety of configurations may be used for the substrate such as rectangles, parallelepipeds, cylinders, spheres, irregular shapes, etc. Further, the technique may be used with a variety of optical fibers, such as single mode, multimode, polarization preserving, hollow core, gradient index, and step index fibers, provided that the fiber has a melting or softening point higher than that of the rigid support material or substrate and that the fiber and substrate have sufficiently matched thermal coefficients to prevent breakage upon cooling. Typically, both multimode and single-mode fibers may be used. Further, it may be possible to use a substrate or rigid support material having an identical melting point as the fiber if some distortion of the fiber is acceptable.

Figure 7A:
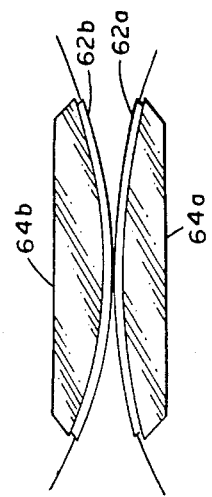
FIG. 7a illustrates a coupler including a pair of fibers interfaced on respective arched substrates.
Figure 7:
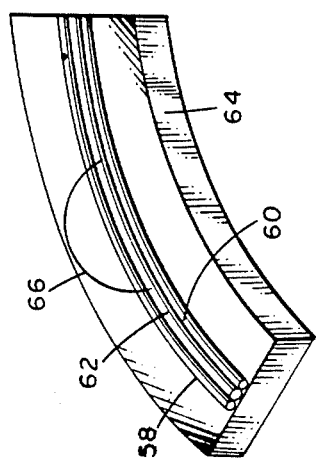
FIG. 7 illustrates a ruggedized fiber of the subject development wherein the fiber is flexed to create a coupling region.

The embodiment illustrated in FIG. 7 comprehends the use of alignment rods 58, 60 made of quartz, glass, metal, ceramic or other suitable material to maintain an optical fiber 62 on a curved support material 64. Such an assembly may be useful to create a coupler by later combining the assembly with a suitably curved support material also containing an optical fiber as illustrated in FIG. 7a. A coupler made using the features discussed above and illustrated in FIGS. 7 and 7a may then be embedded in any other suitable material such as room-temperature vulcanizing silicone (RTV) or epoxy for further protection. In view of the above discussion, it will be obvious to those skilled in the art of etching optical fibers that the characteristics of the exposed fibers can be controlled by varying temperature profiles during heating, or by varying etchant concentration and composition with time, etc. to obtain the desired characteristics. By having a portion 66 of the fiber exposed, etching provides a precise and controlled means of removing the cladding while carefully controlling the proximity of the removal to the core.

Figure 8:
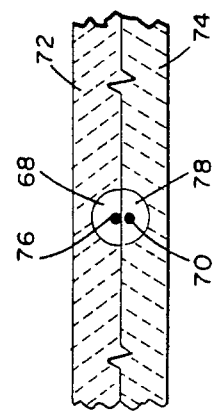
FIG. 8 illustrates an evanescent wave coupler using ruggedized fibers.

FIG. 8 illustrates a basic single-mode evanescent wave coupler made from optical fibers ruggedized by fusion to a rigid substrate. Obviously, a multimode coupler can be made using the same technique. In this embodiment, two fibers 68 and 70 are each individually embedded and fused to separate support materials 72 and 74, respectively. The fibers and support materials are then selectively etched or polished until a core area 76 and 78 of each fiber is exposed. The fibers and their respective substrates are then aligned to allow coupling to occur. If desired, the fibers may also be subsequently fused to one another using the substrates to manipulate and hold the fibers during heating. As will be obvious to those skilled in the art, grooves, slots, etc. may be provided in the support material to offer ease of alignment and fabrication and may become an integral part of the completed optical device.

Figure 9A:
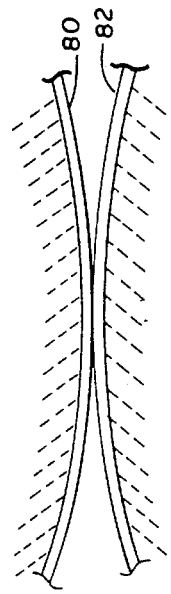
FIGS. 9a–b illustrate another method of making an evanescent wave coupler using ruggedized fibers.
Figure 9B:
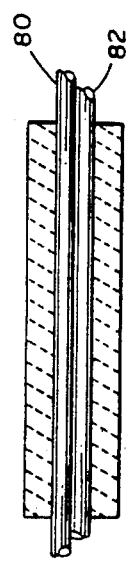

One possible advantage of subsequently fusing individually ruggedized fibers together to form a coupler may be to reduce inadvertent warping during the initial stages of fabrication. FIG. 9a illustrates that possible warping may occur to the ruggedized fibers 80, 82 during initial fabrication. During the fabrication process for forming an interface between a fiber and a substrate, heat may be applied continuously to allow the substrate to continue to deform, to allow the fiber to bend, and to reposition the two structures very slowly, thus changing the optical properties of the coupler. When the desired properties are attained, heat may be removed and the coupler solidified in the desired configuration. Accordingly, as can be seen in FIG. 9b, subsequent fusion of ruggedized fibers 80, 82 together may obviate undesirable warpage. It may be possible with this process to produce a coupler having highly reliable optical characteristics.

Figure 10A:
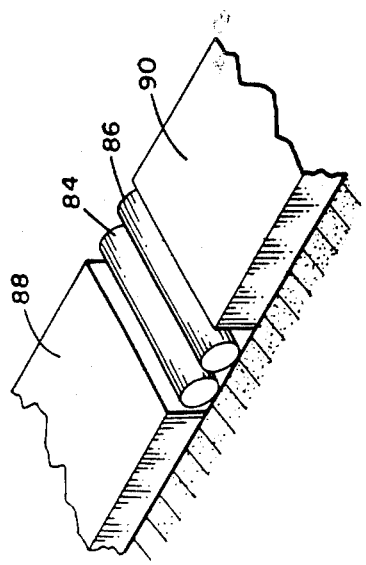
FIGS. 10a–b illustrate yet another method of making an optical device using a plurality of ruggedized fibers.
Figure 10B:
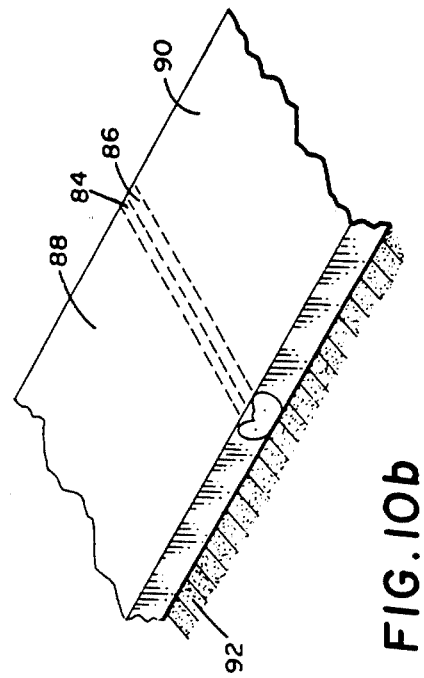

As can be seen in FIG. 10, a pair of fibers 84 and 86 may be fused to respective substrates 88 and 90; while simultaneously resting on a common non-stick surface 92. In this embodiment, the pair of fibers 84 and 86 may be placed parallel to one another. The fibers do not fuse together upon heating in the preferred embodiment, but are maintained in parallel juxtaposition by means of the common nonstick surface 92. After an interface has been formed between each fiber and its respective substrate, the fibers may be etched to a core area. The substrates are then pushed together and the cores of the fibers are thereby automatically aligned at the correct height. The two substrates 88 and 90 may be subsequently fused together to form a very accurately aligned coupler. As will be obvious to those skilled in the art, it thus may be possible to produce a high quality coupler very economically.

Figure 12:
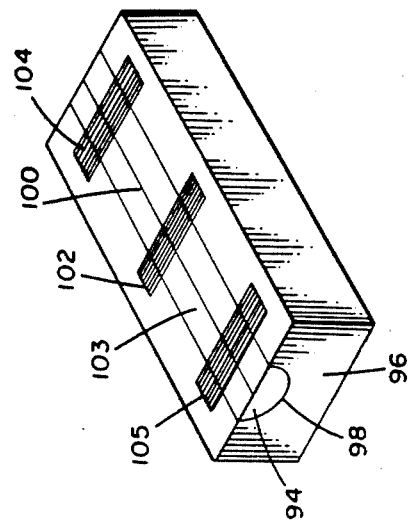
FIG. 12 illustrates a wavelength-selective filter using the embedded-fiber technique.

The present invention further comprehends the fabrication of a wavelength-selective filter using a ruggedized fiber. This embodiment is shown generally in FIG. 12. In this embodiment, a fiber 94 is embedded in a substrate 96 using the fused fiber technique described herein to form an interface 98 between the fiber and the substrate. A portion of the fiber is removed to expose a core area 100 along the length of the fiber. A grating 102 is super-imposed on the exposed core. In the preferred embodiment, the fiber is etched or polished to a core area in this region. The grating acts as a filter to allow certain predetermined wavelengths to be diffracted from the fiber, or conversely, to be diffracted into the fiber. Such a device may have tremendous impact in wavelength multiplexing wherein different wavelengths of light carry different information.

Obviously, a single-mode or a multimode fiber could be used in this embodiment. The fiber may be embedded in a glass substrate, such as Corning Code 7070 or other material. The fiber and substrate may then be polished or etched to a substantially planar surface as shown in the figure. Conventional photolithographic techniques can be used to create minute lines comprising a diffraction grating on top of the planar surface 103. Alternatively, a conventional grating 104 ruled on plastic, glass, or other suitable material, may be laid on top of the fiber. Such a grating may periodically perturb the evanescent field of the light carried in the fiber core causing certain wavelengths of light to be diffracted from the core. The radiation angle of the diffracted light through a particular grating is a function of the wavelength of the light diffracted.

Alternatively, the subject invention comprehends the use of fine grooves etched in a silicon wafer. The wafer 105 is placed over an exposed portion of a fiber core 100 and is heated sufficiently so that it deforms slightly to induce the desired periodic pattern directly onto the cladding and core of the fiber.

This embodiment has the obvious advantage of producing a wavelength selective filter which is fabricated directly on an optical fiber. Further, the use of the embedded fiber technique assures material uniformity in the planar region of the core and cladding. Still further, since the fiber is an integral part of the filter device, no special coupling between the device and fiber is required. And yet still further, since the planar surface of the core and cladding is typically all glass, it is relatively isotropic and thus amenable to photolithographic techniques to produce the desired grating.

Although the invention has been described and illustrated in detail, it is to be clearly understood that the same is by way of illustration and example only and is not to be taken by way of limitation, the spirit and scope of this invention being limited only by the terms of the appended claims.

We claim:

1. An optical device comprising:
   (a) an optical fiber having an outer surface; and
   (b) a substrate rigidly supporting said optical fiber by forming a molecular interface with a portion of said outer surface while said fiber is maintained in axial tension.

2. An optical device as recited in claim 1, wherein said substrate is formed of glass.

3. An optical device as recited in claim 2, wherein said glass substrate is substantially thicker than said fiber and said substrate and said fiber have a difference in coefficient of thermal expansion of less than $27.5 \times 10^{-7}/°$ C.

4. An optical device as recited in claim 1 wherein the softening point of said substrate is lower than the softening point of said fiber.

5. An optical device as recited in claim 1 wherein said fiber is completely embedded in said substrate.

6. An optical device as recited in claim 1, wherein a longitudinal portion of said fiber is partially embedded in and fused to said substrate, an axially extending arcuate surface area of said longitudinal portion of said fiber extending outwardly through the periphery of said substrate, said substrate and said fiber having a strain of less than or equal to $5 \times 10^{-3}$ there between.

7. An optical device as recited in claim 6 wherein said outwardly extending arcuate surface area is defined by a 180° angle extending radially outward from the axis of said fiber.

8. An optical device as recited in claim 6 wherein said outwardly extending arcuate surface area is defined by an oblique angle extending radially outward from said fiber.

9. An optical device as recited in claim 1 wherein the refractive index of said substrate is higher than the refractive index of the fiber.

10. An optical device as recited in claim 1 wherein the refractive index of said substrate is lower than the refractive index of said fiber.

11. An optical device as recited in claim 1 wherein the difference in coefficients of thermal expansion between said fiber and said substrate is less than $1 \times 10^{-5}/°$ C.

12. An optical device as recited in claim 1 wherein the coefficient of thermal expansion of said fiber and said substrate are unequal.

13. A method of fabricating a rigidly supported optical fiber device comprising the steps of:
   (a) assembling a longitudinal, outer-surface portion of an optical fiber in juxtaposition with a rigid support material having a lower viscosity than said fiber;
   (b) maintaining said fiber in axial tension;
   (c) heating said assembly so as to allow partial softening of said support material to allow a bonded interface to be formed directly between said fiber and said support material; and
   (d) cooling said assembly to allow said interface to harden to form a rigid interface.

14. The method of fabrication as recited in claim 13 wherein said rigid support material is a glass substrate.

15. The method of fabrication as recited in claim 13 further comprising the additional step of biasing said fiber and said support material toward one another during said heating and cooling of said assembly to allow an arcuate portion of said outer surface of said fiber to become embedded in said support material during fusing.

16. The method of fabrication as recited in claim 13 further comprising the additional step of positioning a mold of nonstick material in juxtaposition with said fiber prior to heating to prevent fusing of said support material about the entire outer surface of said fiber.

17. The method of fabrication as recited in claim 16 further comprising polishing the nonstick material prior to positioning said material in juxtaposition with said fiber to provide a flat mold.

18. The method of fabrication as recited in claim 13 wherein heat is applied to said assembly from a heat source positioned below said assembly.

19. The method of fabrication as recited in claim 13 wherein heat is applied to said assembly from a heat source positioned above said assembly.

20. The method of fabrication as recited in claim 13 wherein said heating step further includes moving a heating source along the length of said fiber to evenly distribute heat to the fiber and the support material.

21. An optical device comprising:
   (a) an optical fiber; and
   (b) a rigid support material wherein said optical fiber is maintained in axial tension while said optical fiber is positioned asymmetrically with respect to said support material and while said support material is fused to the outer surface of the fiber.

22. An optical device as recited in claim 21 wherein said support material has a configuration which varies along a longitudinal portion of the fiber.

23. An optical device as recited in claim 21 wherein said support material is a rectangularly-shaped glass substrate.

24. An optical device as recited in claim 21 wherein said fiber is a single-mode fiber.

25. An optical device as recited in claim 21 wherein said fiber is a multimode fiber.

26. An optical device as recited in claim 21 wherein said fiber is a polarization-preserving fiber.

27. An optical device as recited in claim 21 wherein said fiber is a hollow-core fiber.

28. An optical device as recited in claim 21 wherein said fiber is a gradient-index fiber.

29. An optical device as recited in claim 21 wherein said fiber is a stepped-index fiber.

30. An optical device as recited in claim 21 wherein said fiber has a melting point higher than that of said support material.

31. An optical device as recited in claim 21 further comprising alignment means for positioning said fiber with respect to said support material.

32. An optical device as recited in claim 21 further comprising means for molding said support material about a longitudinal portion of said fiber.

33. An optical device, comprising:
   (a) an optical fiber;
   (b) a rigid glass support material; and
   (c) an interface region in which said support material is fused directly to an outer surface portion of said optical fiber, at least one of said fiber and said support material being provided with a diffusible constituent which diffuses into the other material as said support material and said outer surface portion are fused together in said interface region to provide an optical device being capable of relatively uniform etching.

34. An optical device as recited in claim 33, wherein said glass support material is substantially thicker than said fiber.

35. An optical device as recited in claim 33, wherein the softening point of said rigid support material is lower than the softening point of said fiber.

36. The optical device as recited in claim 33, wherein said fiber is completely embedded in said support material.

37. An optical device as recited in claim 33, wherein a longitudinal portion of the fiber is partially embedded in and bonded to said support material, an axially extending arcuate surface area of said longitudinal portion of said fiber extending outwardly through the periphery of said support material.

38. An optical device as recited in claim 33, wherein said support material is provided with boron as a diffusible constituent.

39. An optical device as recited in claim 38, wherein said boron from said support material has diffused into an outer bonding surface of said optical fiber by a distance of 5 Å.

* * * * *